(12) United States Patent
Raimondi et al.

(10) Patent No.: US 9,112,571 B1
(45) Date of Patent: Aug. 18, 2015

(54) METHOD FOR CORRELATING A RECEIVED SATELLITE RADIO-NAVIGATION SIGNAL AND CORRELATION DEVICE IMPLEMENTING THE METHOD

(71) Applicant: THALES, Courbevoie (FR)

(72) Inventors: Mathieu Raimondi, Toulouse (FR); Hanaa Al Bitar, Toulouse (FR); Charles Fernet, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/622,615

(22) Filed: Feb. 13, 2015

(30) Foreign Application Priority Data

Feb. 14, 2014 (FR) .................................... 14 00404

(51) Int. Cl.
*H04B 1/00* (2006.01)
*H04B 1/10* (2006.01)
*H04B 7/185* (2006.01)
*H04B 1/76* (2006.01)
*H04B 1/69* (2011.01)

(52) U.S. Cl.
CPC ............. *H04B 1/1081* (2013.01); *H04B 1/69* (2013.01); *H04B 1/76* (2013.01); *H04B 7/185* (2013.01)

(58) Field of Classification Search
CPC .......... H04B 1/1081; H04B 1/76; H04B 1/69; H04B 7/185
See application file for complete search history.

(56) References Cited

U.S. PATENT DOCUMENTS

| 2002/0031109 A1* | 3/2002 | Maru ............................ 370/342 |
| 2009/0189808 A1 | 7/2009 | Chen |
| 2010/0061426 A1* | 3/2010 | Eerola ............................ 375/142 |
| 2011/0261805 A1* | 10/2011 | Landry et al. ................. 370/342 |
| 2013/0136154 A1* | 5/2013 | Chomal et al. ................ 375/136 |
| 2014/0132446 A1* | 5/2014 | Lennen .................... 342/357.51 |

OTHER PUBLICATIONS

Kannan Muthuraman, et al., "Performance Evaluation of L2C Data/Pilot Combined Carrier Tracking", Proceedings of the 21st International Technical Meeting of the Satellite Division of the Institute of Navigation (ION GNSS 2008), The Institute of Navigation, Sep. 19, 2008, pp. 1658-1666, Manassas, VA, USA, XP056002763.

Michael Iran, "Performance Evaluations of the New GPS L5 and L2 Civil (L2C) Signals", Navigation, Dec. 1, 2004, pp. 199-212, vol. 51, No. 3, Institute of Navigation, Fairfax, VA, USA, XP056004460.

* cited by examiner

*Primary Examiner* — Erin File

(74) *Attorney, Agent, or Firm* — Baker & Hostetler LLP

(57) ABSTRACT

A method is provided for correlating a received satellite radio-navigation signal made up of a first pilot signal modulated with a first spreading code and a second data signal modulated with a second primary spreading code of a length equal to that of the first spreading code, the second data signal being further modulated with a secondary sequence comprising a plurality of chips, the duration of a chip being equal to a multiple of the length of the second primary spreading code, the first pilot signal and the second data signal being synchronous. The correlation method comprises the following steps: first correlations, over a plurality N of periods of the first spreading code, of the radio-navigation signal with the first spreading code; the selection, out of the N first correlations, of a subset containing a number M of correlations; and the coherent integration of the M correlations of the subset.

12 Claims, 6 Drawing Sheets

METHOD FOR CORRELATING A RECEIVED SATELLITE RADIO-NAVIGATION SIGNAL AND CORRELATION DEVICE IMPLEMENTING THE METHOD

CROSS-REFERENCE TO RELATED APPLICATION

This application claims priority to foreign French patent application No. FR 1400404, filed on Feb. 14, 2014, the disclosure of which is incorporated by reference in its entirety.

FIELD OF THE INVENTION

The invention relates to the field of the receivers of satellite radio-navigation signals, also called GNSS (Global Navigation Satellite System) signals. The invention applies notably to the GALILEO or GPS satellite navigation systems.

More specifically, the invention relates to the signals made up of a coherent sum of two in-phase signals, such as the signal E1 of the GALILEO system and relates to a method and a device for correlating such signals.

BACKGROUND

The signal E1 of the GALILEO satellite navigation system is made up of a coherent sum of two signals. The first signal, called pilot signal, is modulated by a first spreading code and is used mainly to perform distance measurements between a satellite and a receiver of the signal in order to perform positioning computations. The second signal is a signal which conveys data. It is modulated by a second spreading code, each period of the code being associated with a symbol to be sent. A symbol is obtained by applying a binary modulation to the bit to be transmitted. The two spreading codes are different but of identical periods, for example, in the case of the signal E1, this period is equal to 4 ms.

Upon the reception of the signal, the purpose of the processing operations performed is notably to detect the start of a period of the spreading code of the pilot signal but also to demodulate the data of the second signal. For this, a correlation computation is performed between a local replica of the first spreading code with the signal. The result of the correlation is then integrated over a plurality of periods of the code (for example 25 periods) to counter the influence of the thermal noise and allow a correlation peak to be identified.

The result of the correlation is disturbed by two distinct sources of noise. Firstly, a thermal noise disturbs the signal in its transmission and affects the result of the correlation with the local code. One conventional means for countering the influence of the thermal noise consists in increasing the integration time. However, the presence of the data signal modulated with a second spreading code also disturbs the result of the correlation of the overall signal with the first spreading code because the intercorrelation between the pilot signal and the data signal is not zero. The impact of the level of intercorrelation between the two signals on the result of the correlation can be considerable in particular for the applications which require enhanced accuracy on the positioning information. Furthermore, the noise linked to the intercorrelation between the pilot signal and the data signal can become more influential than the thermal noise for high signal-to-noise ratios.

The known GNSS receivers more often than not use a high coherent integration time to counter the influence of the noise. Now, this solution does not make it possible to reduce the level of intercorrelation between the pilot signal and the data signal.

SUMMARY OF THE INVENTION

The invention proposes a method and a device for correlating a satellite radio-navigation signal which makes it possible to counter the influence of intercorrelation between two signals summed coherently to construct the GNSS signal. The invention makes it possible to minimize the overall noise level affecting the result of the correlation between the local code and the GNSS signal. It applies advantageously to the GALILEO E1 signals but also to any other radio-navigation signal made up of two signals modulated by two distinct spreading codes and summed coherently.

The subject of the invention is a method for correlating a received satellite radio-navigation signal made up of a first pilot signal modulated with a first spreading code and a second data signal modulated with a second primary spreading code of a length identical to that of the first spreading code, said second data signal being further modulated with a secondary sequence comprising a plurality of chips, the duration of a chip being equal to a multiple of the length of the second primary spreading code, the first pilot signal and the second data signal being synchronous, said correlation method comprising the following steps:

first correlations, over a plurality N of periods of said first spreading code, of the radio-navigation signal with said first spreading code, the selection, out of the N first correlations, of a subset containing a number M of correlations, said subset being chosen as a function of an estimation of the signal-to-noise ratio of the received signal and of the number of pairs of chips of opposite signs out of the chips of said secondary sequence, the coherent integration of the M correlations of said subset.

According to a particular aspect of the invention, the number M of correlations of said subset is determined by simulation, said number M being the number which makes it possible to obtain, on the result of coherent integration of the M correlations, the lowest overall noise level as a function of a given signal-to-noise ratio and of the number of pairs of chips of opposite signs out of the chips of said secondary sequence.

According to a particular aspect of the invention, said subset contains at least the first correlations in phase with the chips of said secondary sequence belonging to the pairs of chips of opposite signs.

According to a particular embodiment of the invention, said secondary sequence is a secondary spreading code.

According to a particular embodiment of the invention, said secondary sequence is a data sequence in which the chips are binary symbols obtained by modulation of data bits, said correlation method further comprising second correlations, over a plurality N of periods of said second spreading code, of the radio-navigation signal with said second spreading code to deduce therefrom the values of the chips of said secondary sequence.

According to a particular embodiment of the invention, the estimation of the signal-to-noise ratio of the received signal is determined from the result of coherent integration of the M correlations.

According to a particular aspect of the invention, the result of coherent integration of the M correlations is used as input for a code or phase or frequency discriminator.

According to a particular aspect of the invention, said signal is of the GALILEO E1 type.

Also the subject of the invention is a device for correlating a received satellite radio-navigation signal made up of a first pilot signal modulated with a first spreading code and a second data signal modulated with a second primary spreading code of a length identical to that of the first spreading code, said second data signal being further modulated with a secondary sequence comprising a plurality of chips, the duration of a chip being equal to a multiple of the length of the second primary spreading code, the first pilot signal and the second data signal being synchronous, the correlation device comprising:

a first correlator for performing first correlations, over an integer number N at least equal to one of periods of said first spreading code, of the radio-navigation signal with said first spreading code, a selector for selecting, out of the N first correlations, a subset containing a number M of correlations, said subset being chosen as a function of an estimation of the signal-to-noise ratio of the received signal and of the number of pairs of chips of opposite signs out of the chips of said secondary sequence, an integrator for performing the coherent integration of the M correlations of said subset.

According to a particular variant of the device according to the invention, the latter further comprises a second correlator for performing second correlations, over a plurality N of periods of said second spreading code, of the radio-navigation signal with said second spreading code to deduce therefrom the values of the chips of said secondary sequence.

Also the subject of the invention is a receiver of satellite radio-navigation signals comprising a correlation device according to the invention, a computer program comprising instructions for the execution of the method for correlating a satellite radio-navigation signal according to the invention, when the program is executed by a processor and a processor-readable storage medium on which is stored a program comprising instructions for the execution of the method for correlating a satellite radio-navigation signal according to the invention, when the program is executed by a processor.

BRIEF DESCRIPTION OF THE DRAWINGS

Other features and advantages of the present invention will become more apparent on reading the following description in relation to the attached drawings which represent.

DETAILED DESCRIPTION

Figure 1:
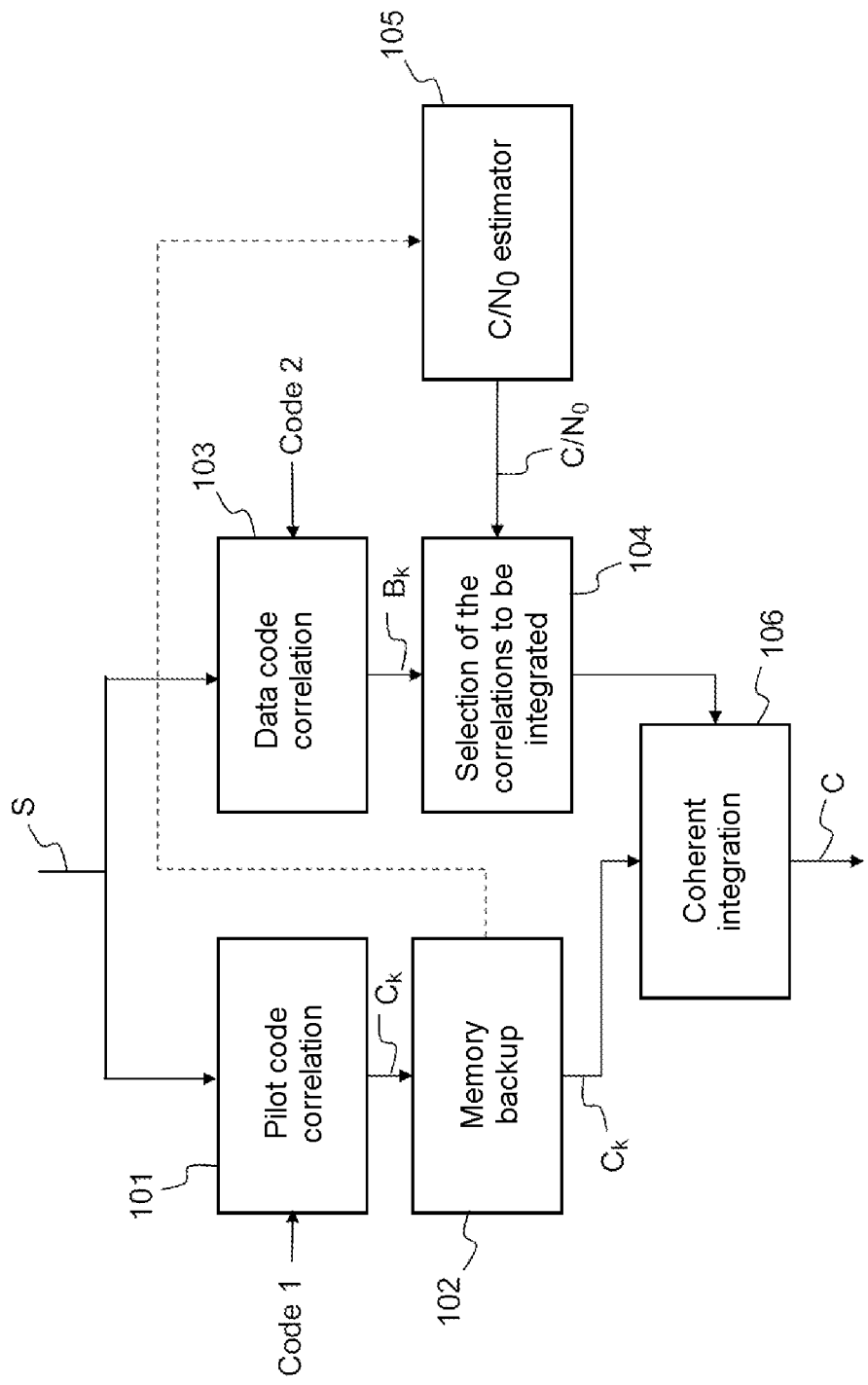
FIG. 1, a flow diagram of the method for correlating a radio-navigation signal according to the invention, FIG. 2, a diagram making it possible to determine the optimum number of correlation outputs to be integrated to minimize the impact of the total noise on the signal correlation function, FIG. 3, a diagram illustrating the principle of selection of correlations with a view to their coherent integration, FIG. 4, a block diagram of a correlation device according to the invention, FIG. 5, a diagram illustrating the noise power at the correlator output as a function of the signal-to-noise ratio with and without application of the invention, FIG. 6, a block diagram of a GNSS receiver according to the invention.

FIG. 1 schematically represents, in a flow diagram, the steps in implementing the method, according to the invention, for correlating a radio-navigation signal.

In a first step 101, the received radio-navigation signal S is correlated with a local replica of the first spreading code code1 associated with the pilot signal. The correlation 101 is performed over a duration equal to that of the spreading code, for example 4 ms in the case of the GALILEO E1 signal.

The result of the correlation (in the absence of noise) between the first code code1 and the received signal S can be formalized via the following relationship:

$$C_k = \frac{1}{N} \cdot \int_0^{N \cdot T} (C'_{E1-C}(t-\tau) + C'_{E1-B}(t-\tau)) \cdot C_{E1-C}(t) \, dt = 1 + X_{B/C} \quad (1)$$

$C'_{E1-C}$ is the spreading code of the received pilot signal.
$C'_{E1-B}$ is the spreading code of the received data signal.
$C_{E1-C}$ is the spreading code of the pilot signal generated locally.

The relationship (1) reveals an intercorrelation term $X_{B/C}$ between the spreading code of the received data signal and the spreading code of the locally generated pilot signal. The invention aims to counter the influence of this intercorrelation term.

The correlation results $C_k$ are backed up 102 over a given time horizon. For example, a number of correlation results $C_k$ are backed up in a buffer memory of FIFO type in order to accumulate them.

In succession, or simultaneously, the received signal S is also correlated 103 with a local replica of the second spreading code code2 associated with the data signal.

The demodulation of the data signal culminates in the recovery of the bits $B_k$ transmitted via this data channel.

From the bits $B_k$ and from an estimation 105 of the signal-to-noise ratio C/NO, a selection 140 of certain backed-up correlation results is performed.

Finally, a coherent integration 106 of the selected correlation results is performed.

The different steps of the method according to the invention can be executed in an order different from that described above. In particular, depending on implementation constraints, the steps of the method can be executed simultaneously or sequentially, or both.

The selection of the correlation results to be integrated is performed as follows. First of all, the pairs of opposite bits are identified in the sequence of the bits demodulated on the data channel. The number of pairs of opposite bits in the sequence is determined. Since the pilot signal and the data signal are summed coherently and in phase to obtain the radio-navigation signal, the two signals are synchronous and each demodulated bit $B_k$ can be made to correspond to a correlation result $C_k$. By selecting, for their coherent integration, the correlation results associated with the demodulated bits of all of the pairs of opposite bits, there is an assurance that the intercorrelation between the first local spreading code code1 and the data signal, modulated by the second spreading code, is zero. In effect, two opposite bits generate two intercorrelation results of the same absolute value but of opposite signs, and their influence is therefore mutually canceled out. For example, in the sequence of bits {1 1 0 1 1 1 0 0}, there are three pairs of opposite bits (0 1).

However, if the sequence of demodulated bits contains a low number of pairs of opposite bits, for example if this sequence contains only one bit at 0 and all the other bits at 1, then, to cancel the intercorrelation, it would be best to integrate only two correlation results which presents the drawback of a low resistance to the thermal noise.

In other words, to globally minimize the influence of the noise on the result C of the coherent integration of the unitary correlations, it is best to find a compromise between a large number of integrated correlations which makes it possible to minimize the thermal noise and a lower number, matched to the sequence of demodulated bits, which makes it possible to counter the noise linked to the intercorrelation between the two spreading codes (pilot channel and data channel).

To optimally determine the number of correlations to be integrated, one possible method is to simulate the overall noise level obtained as a function of the signal-to-noise ratio affecting the received signal on the one hand and the number of pairs of opposite bits in the sequence of demodulated bits on the other hand.

Figure 2:
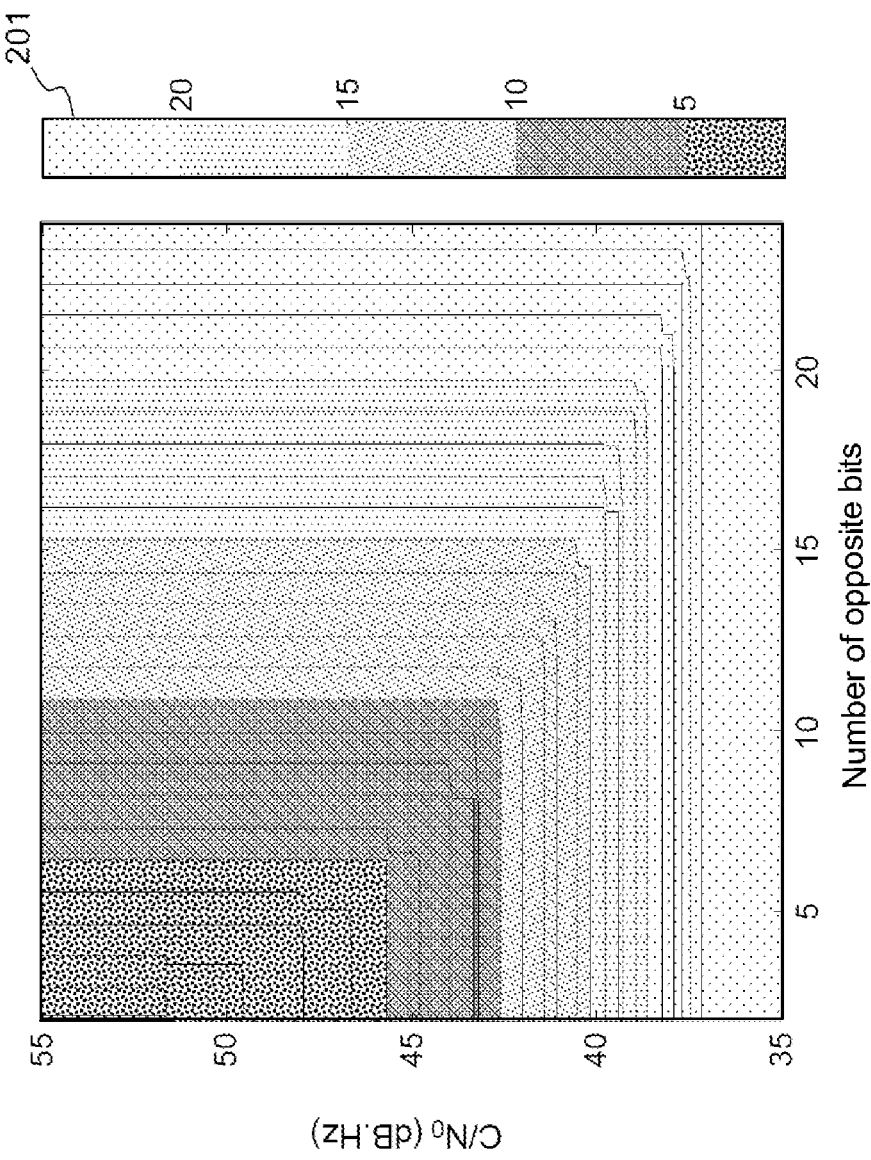

FIG. 2 represents, in a diagram, the optimum number of correlations to be integrated (represented on the scale 201 on the right) as a function of the signal-to-noise ratio C/NO (represented on the y axis) and of the number of bits of opposite values (represented on the x axis). In the example, obtained by simulation, of FIG. 2, the number of correlators varies between 1 and 25.

FIG. 2 teaches that, when the signal-to-noise ratio is low (for example within a range of values between 35 and 40 dB.Hz in FIG. 2), the thermal noise level is much more influential than the level of intercorrelation. In such a case, it is more optimal to use the maximum number of correlations (in the example of FIG. 2, 25 correlations) to benefit from the integration gain.

Conversely, when the signal-to-noise ratio is high (for example within a range of values between 50 and 55 dB.Hz), the level of intercorrelation is more influential than the thermal noise level and it is then more advantageous to adapt the number of correlations to be integrated as a function of the number of opposite bits. It is then found that the lower the number of opposite bits becomes, the more advantageous it becomes to reduce the number of correlations to be integrated.

From an estimation of the signal-to-noise ratio and of the number of opposite bits, it is therefore possible to determine, using FIG. 2, the optimum number of correlations to be integrated. Once this number is determined, the backed-up correlation results associated with the opposite bits are selected as a priority then possibly complemented with other correlation results if necessary.

Figure 3:
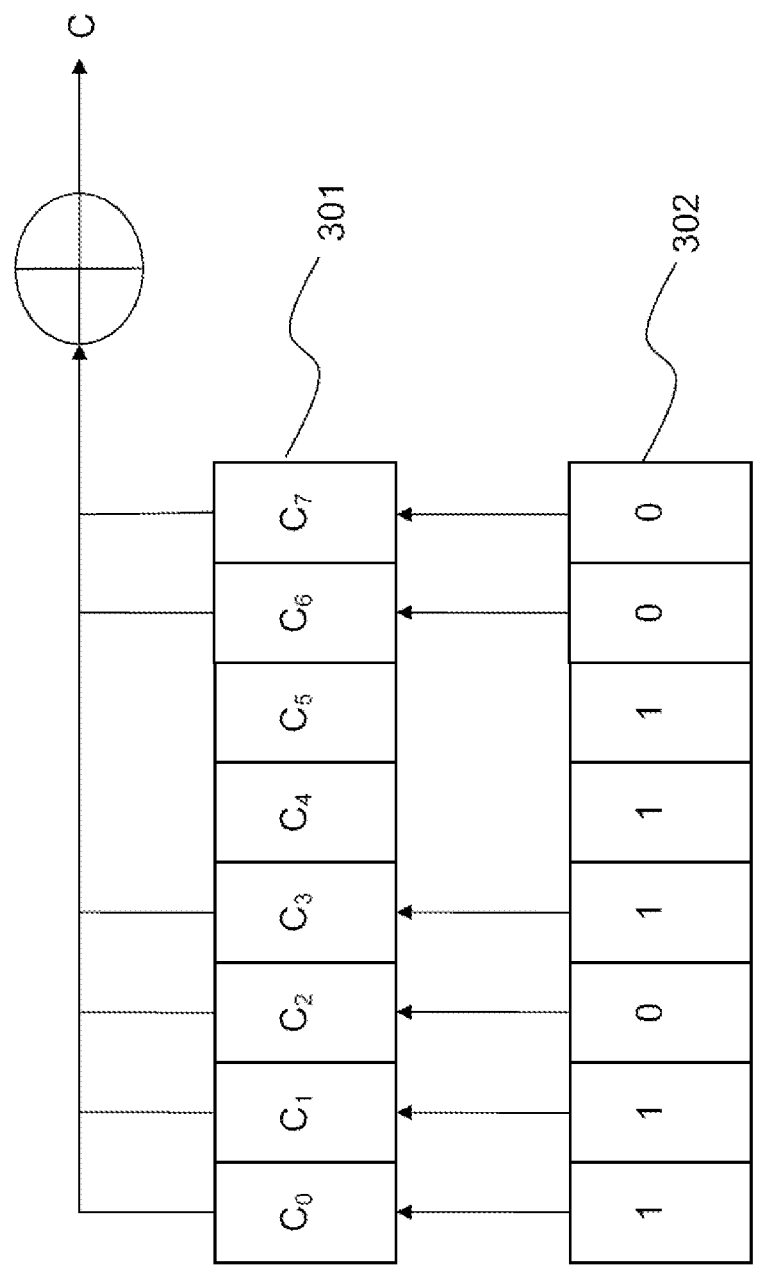

FIG. 3 illustrates, in a nonlimiting example, the principle of selection of the correlations to be accumulated for the sequence of demodulated bits {1 1 0 1 1 1 0 0}. The sequence 301 corresponds to the correlation results computed successively over a plurality of periods of the code of the pilot channel. The sequence 302 corresponds to the bits demodulated on the data channel. Since the pilot and data channels are synchronous, each correlation result can be made to correspond to a bit of the demodulated sequence. Correlations $C_0$, $C_1$, $C_2$, $C_3$, $C_6$, $C_7$ are selected to be accumulated coherently.

Depending on the signal-to-noise ratio, other correlations out of $C_4$ and $C_5$ can also be selected.

According to another embodiment of the invention, the data signal contained in the radio-navigation signal can be replaced by a signal modulated with a primary spreading code and a secondary spreading code for which the duration of a chip is equal to a multiple of the length of the primary spreading code.

In this case, the data bits are replaced by the chips of the secondary spreading code, the values of which are known to the receiver. The step of selection of the pairs of opposite bits is then replaced by the selection of the pairs of chips of opposite signs in the secondary spreading code. In the example of FIG. 3, the demodulated bits of the sequence 302 can also be replaced by the associated binary symbols, the values of which are taken from the set {−1; +1}.

Generally, the data signal can be seen as a signal modulated with a primary spreading code and a secondary sequence which is either a data sequence, in which case it is necessary to demodulate these data to determine the values of the bits, or a known spreading sequence, in which case it is not necessary to perform the correlation of the signal with this spreading sequence since the values of the chips of which it is made up are known.

Figure 4:
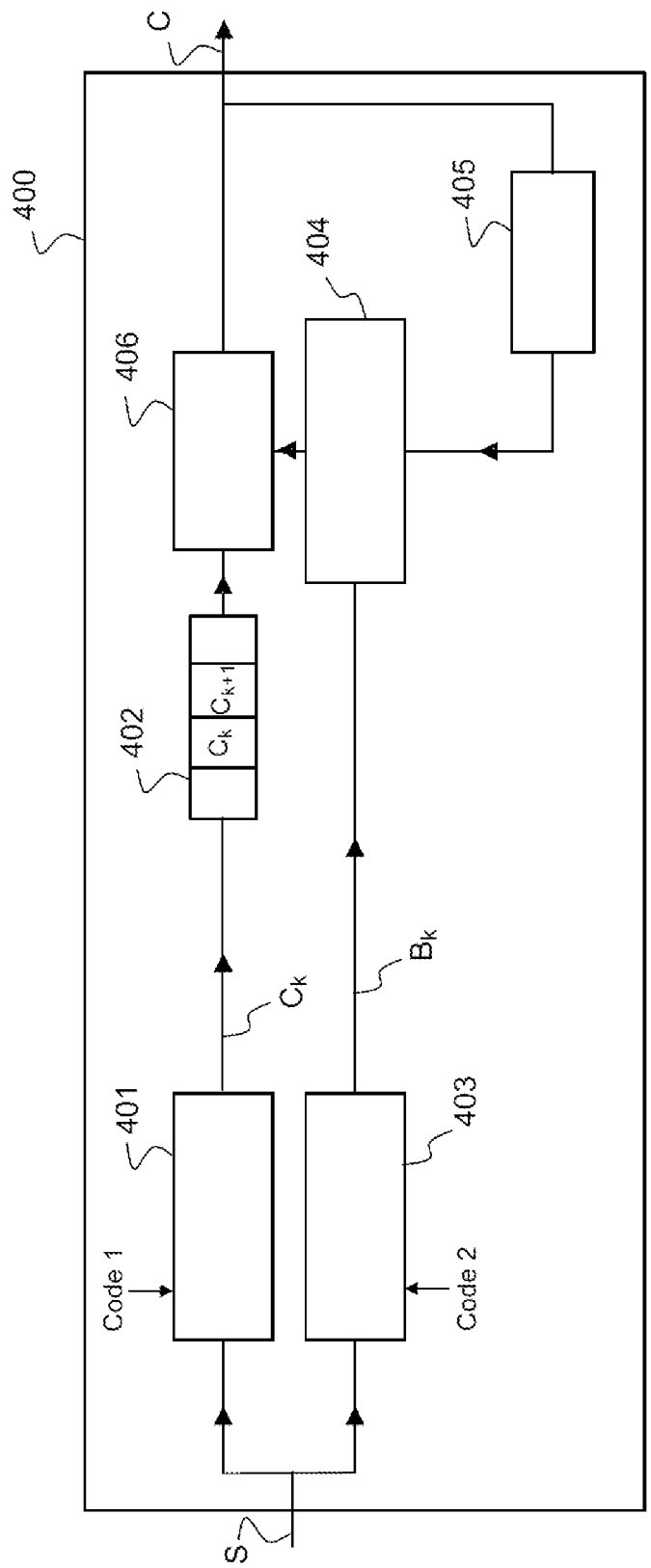

FIG. 4 represents a diagram of a device 400 for correlating a radio-navigation signal S according to the invention. The device 400 comprises means suitable for implementing the different variants of the method according to the invention as described via the flow diagram of FIG. 1.

In particular, the device 400 comprises a first correlator 401 for correlating the received signal S with a first code code1 associated with a pilot channel. The outputs $C_k$ of the first correlator 401 are backed up in a buffer memory 402 with a view to their integration.

The device 400 also comprises a second correlator 403 for correlating the received signal S with a second code code2 associated with a data channel and for demodulating the bits $B_k$ conveyed by this channel.

The device 400 further comprises a module 405 for estimating the signal-to-noise ratio C/NO. This estimation can be made via means external to the invention or can be produced from the result of the coherent integration 406 of the correlations or even from stored correlations $C_k$ (case not represented in FIG. 4). According to a particular variant of the invention, a looped system is used, in which the output C of the integrator 406 is used to measure the signal-to-noise ratio which is then used to select the correlations to be integrated. In such a system, a convergence phase must be provided, during which the signal-to-noise ratio estimator is biased by the intercorrelation level.

The device 400 also comprises a selection module 404 configured to select certain stored correlations $C_k$ as a function of the demodulated bits $B_k$ and of the signal-to-noise ratio C/NO estimation and an accumulator 406 for coherently integrating the selected correlations.

The device 400 according to the invention can comprise software and/or hardware elements. Its various constituent elements can notably be implemented in the form of a processor which can be a generic processor, a specific processor, an application-specific integrated circuit (ASIC) or a field-programmable gate array (FPGA).

The block diagram of FIG. 4 is given as an illustrative and nonlimiting example, and it goes without saying that any variant implementation, notably consisting in combining certain modules within one and the same processor, must be considered as equivalent and falling within the scope of the invention.

According to a variant embodiment of the invention, the targeted objective can also be to obtain an accurate estimate of the signal-to-noise ratio from the result of the coherent integration 406. In this case, it may be preferable to seek to totally cancel the noise level linked to the intercorrelation. For this, preference will therefore be given to selecting only the correlations corresponding to the pairs of opposite bits without further increasing the coherent integration time, and do so if the thermal noise level is otherwise high.

Figure 5:
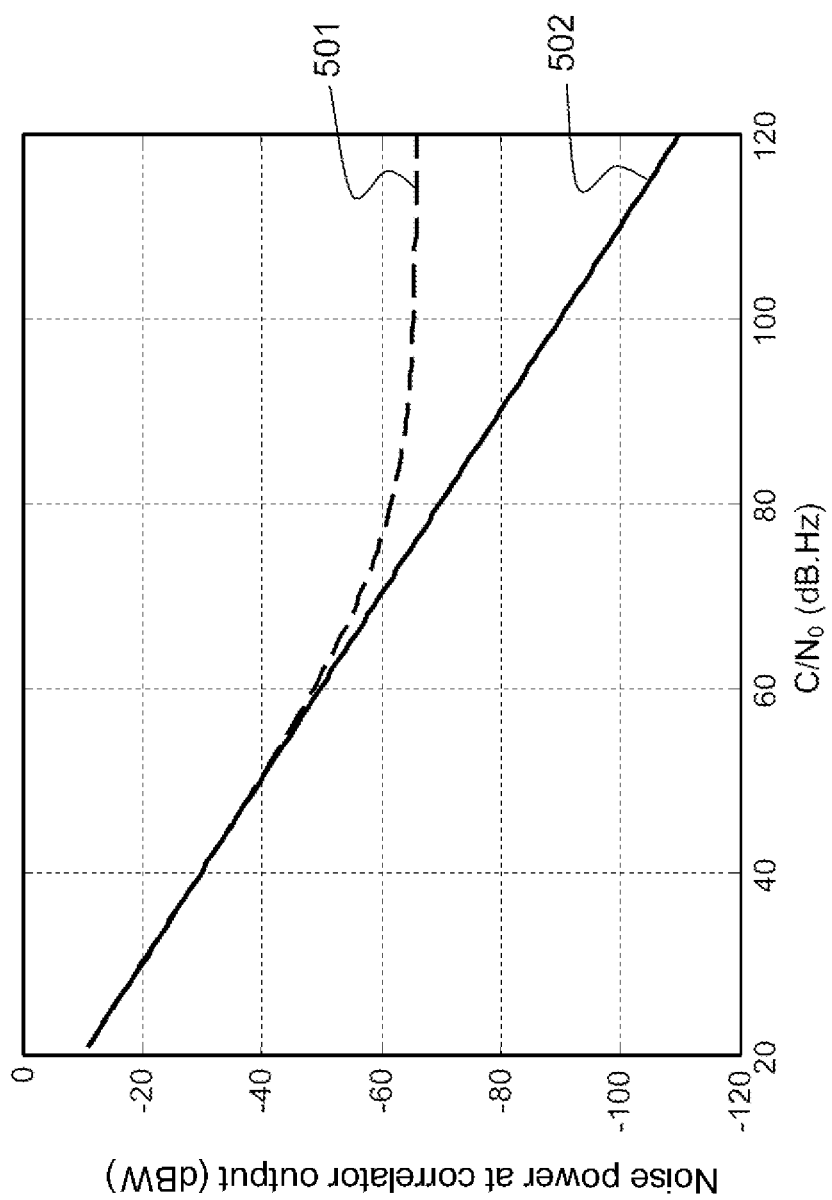

The diagram of FIG. 5 represents the noise power at the output of the correlation device 400, also called the global noise power measured on the output of the integrator 406, as a function of the signal-to-noise ratio C/NO. The global noise power comprises both the thermal noise and the noise linked to the intercorrelation.

The curve 501 represents the noise power measured in the case where the invention is not implemented. A noise flaw can be noted for the high signal-to-noise ratios, this flaw being due to the level of intercorrelation between the two spreading codes which is not zero and which becomes predominant when the power of the thermal noise becomes negligible.

The curve 502 represents the noise power measured in the case where the invention is used. It can be seen that the noise flaw is eliminated and that, with a high signal-to-noise ratio, the global noise level is reduced compared to a conventional solution where all the correlation outputs are integrated.

The correlation result C obtained at the output of the coherent integration 406 can be used, as is known to those skilled in the art, as input for a phase, frequency or code discriminator in order to perform the usual processing operations implemented in a GNSS receiver to perform the code, phase or frequency tracking.

Figure 6:
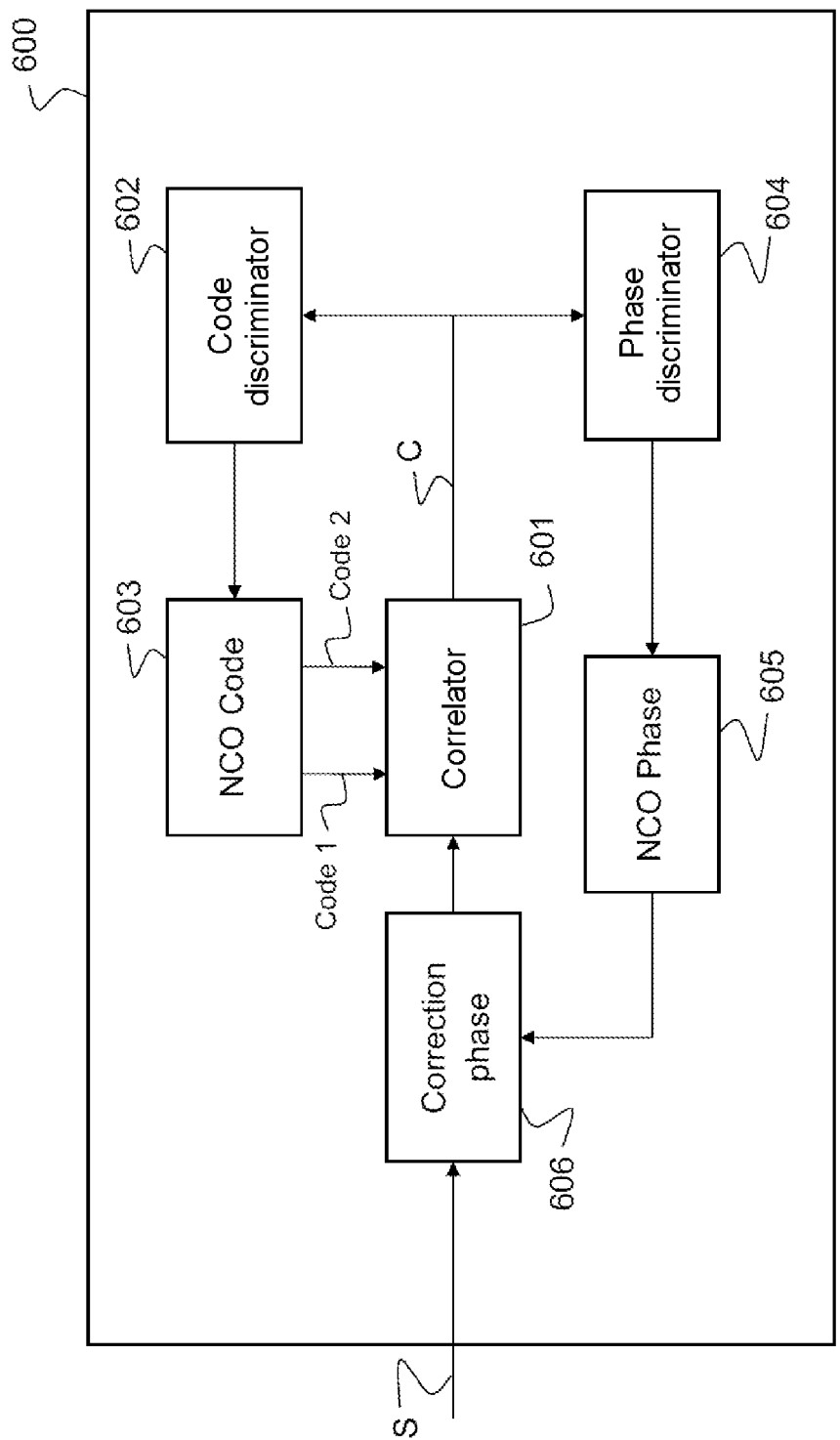

FIG. 6 represents, in a diagram, a satellite radio-navigation receiver 600 according to the invention. Such a receiver comprises a correlation device 601 according to the invention which receives at the input the signal S and produces at the output a correlation C which is supplied to a code discriminator 602 then to a numerical control operator NCO 603 which advances or delays the positioning of the local spreading codes code1 and code2 to produce the correlations with the received signal.

The receiver 600 can also comprise a phase discriminator 604 associated with a numerical control operator NCO 605 which delivers an estimate of the phase error to a corrector 606 which compensates the phase error of the received signal.

The receiver 600 can also comprise other elements such as a frequency discriminator or a signal-to-noise ratio estimator which are not represented in FIG. 6.

A person skilled in the art, given his or her knowledge in the field of GNSS receivers, will be able to integrate the correlation device 601 according to the invention with the different elements needed to track the synchronization of the received radio-navigation signal to produce any other variant of the GNSS receiver 600 described in FIG. 6.

The invention claimed is:

1. A method for correlating a received satellite radio-navigation signal made up of a first pilot signal modulated with a first spreading code and a second data signal modulated with a second primary spreading code of a length identical to that of the first spreading code, said second data signal being further modulated with a secondary sequence comprising a plurality of chips, the duration of a chip being equal to a multiple of the length of the second primary spreading code, the first pilot signal and the second data signal being synchronous; said method comprising the steps of:
correlating, over N of periods, the received satellite radio-navigation signal with said first spreading code;
selecting, out of the N correlations, a subset containing M of correlations, said subset being chosen as a function of an estimation of the signal-to-noise ratio of the received signal and of the number of pairs of chips of opposite signs out of the chips of said secondary sequence; and
coherently integrating the M correlations.

2. The method for correlating a satellite radio-navigation signal according to claim 1, in which the number M of correlations of said subset is determined by simulation, said number M being the number which makes it possible to obtain, on the result of coherent integration of the M correlations, the lowest overall noise level as a function of a given signal-to-noise ratio and of the number of pairs of chips of opposite signs out of the chips of said secondary sequence.

3. The method for correlating a satellite radio-navigation signal according to claim 1, in which said subset contains at least the first correlations in phase with the chips of said secondary sequence belonging to the pairs of chips of opposite signs.

4. The method for correlating a satellite radio-navigation signal according to claim 1, in which said secondary sequence is a secondary spreading code.

5. The method for correlating a satellite radio-navigation signal according to claim 1, in which said secondary sequence is a data sequence in which the chips are binary symbols obtained by modulation of data bits, said correlation method further comprising second correlations, over a plurality N of periods of said second spreading code, of the radio-navigation signal with said second spreading code to deduce therefrom the values of the chips of said secondary sequence.

6. The method for correlating a satellite radio-navigation signal according to claim 1, in which the estimation of the signal-to-noise ratio of the received signal is determined from the result of coherent integration of the M correlations.

7. The method for correlating a satellite radio-navigation signal according to claim 1, in which the result of coherent integration of the M correlations is used as input for a code or phase or frequency discriminator.

8. The method for correlating a satellite radio-navigation signal according to claim 1, in which said signal is of the E1 type.

9. A device for correlating a received satellite radio-navigation signal made up of a first pilot signal modulated with a first spreading code and a second data signal modulated with a second primary spreading code of a length identical to that of the first spreading code, said second data signal being further modulated with a secondary sequence comprising a plurality of chips, the duration of a chip being equal to a multiple of the length of the second primary spreading code, the first pilot signal and the second data signal being synchronous said device comprising:
a first correlator for performing first correlations, over an integer number N at least equal to one of periods of said first spreading code, of the radio-navigation signal with said first spreading code;
a selector for selecting, out of the N first correlations, a subset containing a number M of correlations, said subset being chosen as a function of an estimation of the signal-to-noise ratio of the received signal and of the number of pairs of chips of opposite signs out of the chips of said secondary sequence;
an integrator for performing the coherent integration of the M correlations of said subset.

10. The device for correlating a satellite radio-navigation signal according to claim 9, further comprising a second correlator for performing second correlations, over a plurality N of periods of said second spreading code, of the radio-navigation signal with said second spreading code to decode the values of the chips of said secondary sequence.

11. A satellite radio-navigation signals receiver, comprising a device for correlating a received satellite radio-navigation signal according to claim 9.

12. A non-transitory computer-readable storage medium, on which is stored a program comprising instructions for the execution of the method for correlating a satellite radio-navigation signal according to claim 1, when the program is executed by a processor.

* * * * *